UNITED STATES PATENT OFFICE 2,193,717

PROCESS FOR PREVENTING THE CONGEALING OF BLOOD

Willy Faust and Willibald Ender, Ludwigshafen-on-the-Rhine, Germany, assignors to I. G. Farbenindustrie Aktiengesellschaft, Frankfort-on-the-Main, Germany No Drawing. Application June 2, 1939, Serial No. 277,033. In Germany June 8, 1938

7 Claims. (Cl. 99—21)

The present invention relates to a new process for preventing the congealing of blood.

We have found that the congealing of blood, which otherwise takes place a short time after leaving the blood stream, can be prevented by adding to the blood water-soluble amino acids having more than one organic radicle having a carboxyl group on each basic nitrogen atom. These amino acids may also be used in the form of their salts, as for example their sodium, potassium and ammonium salts or other water-soluble salts. Among amino acids of the said kind there may be mentioned for example nitrilo-triacetic acid, ethylene-bis-(imino-diacetic acid), anthranilic acid-N-diacetic acid and other N-diacetic acids in which the third hydrogen atom of the ammonia is replaced by alkyl, aryl, aralkyl or hydroxyalkyl groups; amino acids obtained by the action of chloracetic acid on hydroxylamine, hydrazine or polyamines are also suitable, at least about two molecular proportions of chloracetic acid being used for each nitrogen atom of the last-mentioned components. There may also be mentioned C-phenylnitrilo-triacetic acid, C-dimethyl-nitrilo-triacetic acid and N-(1-carboxy-cyclohexyl)-imino-diacetic acid.

The amino acids or their salts are preferably added to the blood in dissolved form, if desired together with other suitable substances, as for example with salts of oxalic acid, citric acid or the like. Small amounts, as for example from 1 to 2 grams of amino acid per liter of blood are usually sufficient, but smaller or larger amounts may also be used.

The following examples will further illustrate how this invention is carried out in practice, but the invention is not restricted to these examples.

Example 1

From 1 to 2 grams of the sodium salt of nitrilo-triacetic acid, which have preferably been previously dissolved in from 10 to 20 cubic centimeters of water, are added to 1 liter of freshly obtained pig's blood. The blood does not congeal even after standing for a long time.

Example 2

From 1 to 2 grams of the sodium salt of ethylene-bis-(imino-diacetic acid), which have preferably been previously dissolved in from 10 to 20 cubic centimeters of water, are added to 1 litre of cattle blood. The blood does not congeal even after standing for several days.

What we claim is:

1. A process for preventing the congealing of blood, which comprises adding to the blood a water-soluble amino acid containing in the molecule more than one organic radical having a carboxylic group on each basic nitrogen atom.

2. A process for preventing the congealing of blood, which comprises adding to the blood a water-soluble amino acid containing in the molecule more than one organic radical having a carboxylic group on each basic nitrogen atom in the form of a salt.

3. A process for preventing the congealing of blood, which comprises adding to the blood a small amount of a water-soluble amino acid containing in the molecule more than one organic radical having a carboxylic group on each basic nitrogen atom in the form of a salt.

4. A process for preventing the congealing of blood, which comprises adding to the blood a small amount of the sodium salt of nitrilo-triacetic acid.

5. A process for preventing the congealing of blood, which comprises adding to each liter of the blood from 1 to 2 grams of the sodium salt of nitrilo-triacetic acid.

6. A process for preventing the congealing of blood, which comprises adding to the blood a small amount of the sodium salt of ethylene-bis-(imino-diacetic acid).

7. A process for preventing the congealing of blood, which comprises adding to each liter of the blood from 1 to 2 grams of the sodium salt of ethylene-bis-(imino-diacetic acid).

WILLY FAUST.
WILLIBALD ENDER.